Figure 1:
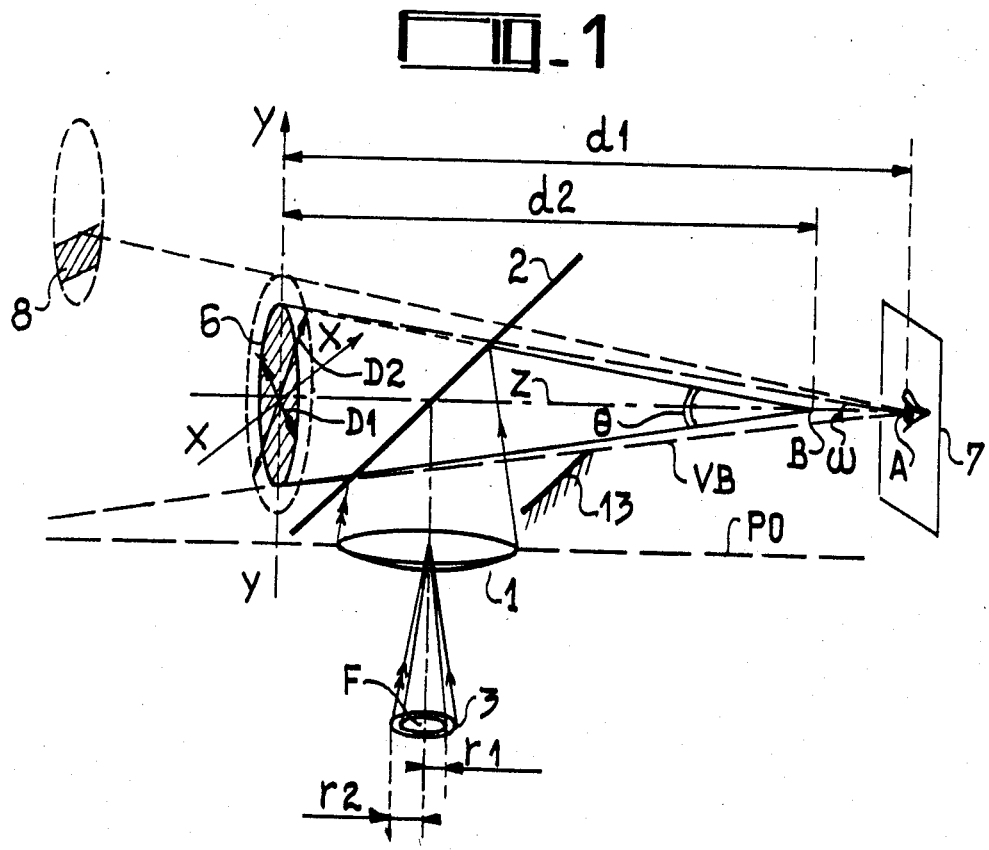

United States Patent [19]
Cojan

[11] 4,111,527
[45] Sep. 5, 1978

[54] DISPLAY INSTRUMENT USING OPTICAL COLLIMATION

[75] Inventor: Yves Cojan, Paris, France

[73] Assignee: Thomson-CSF, Paris, France

[21] Appl. No.: 807,686

[22] Filed: Jun. 17, 1977

[30] Foreign Application Priority Data

Jun. 22, 1976 [FR] France .................... 76 18926

[51] Int. Cl.$^2$ .............................................. G02B 27/14
[52] U.S. Cl. ................................................... 350/174
[58] Field of Search ................ 350/174, 173; 358/250; 356/251, 253–255; 353/14

[56] References Cited
U.S. PATENT DOCUMENTS 3,778,548  12/1973  Wistri ....................... 350/174

Primary Examiner—Jon W. Henry
Attorney, Agent, or Firm—Cushman, Darby & Cushman

[57] ABSTRACT

A display instrument using optical collimation for projecting data into the line of sight of an observer, comprising an optical lens which projects images of luminous objects focused at infinity onto a transparent combining glass. The luminous objects corresponding to data be displayed are positioned in the focal zone of the lens. The images are reflected by the glass into the observer's line of sight. A reflective optical element is arranged parallel to the glass, in the space contained between the optical lens and the field of vision of the observer, to provide an additional optical pupil which forms in conjunction with the original pupil of the instrument an enlarged pupil.

5 Claims, 9 Drawing Figures

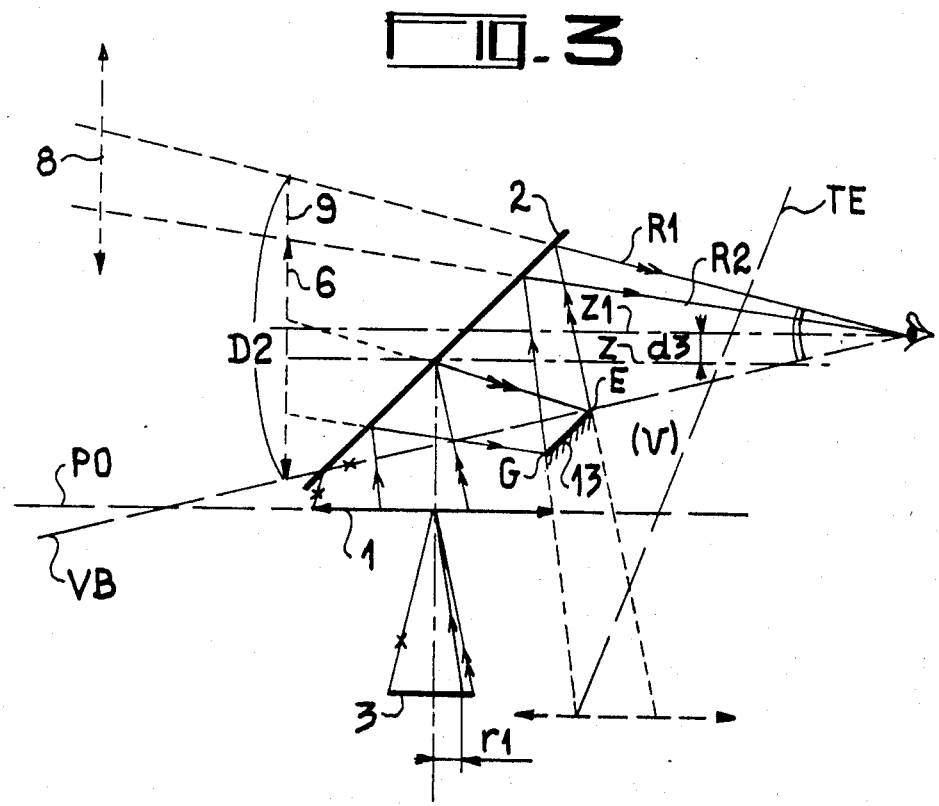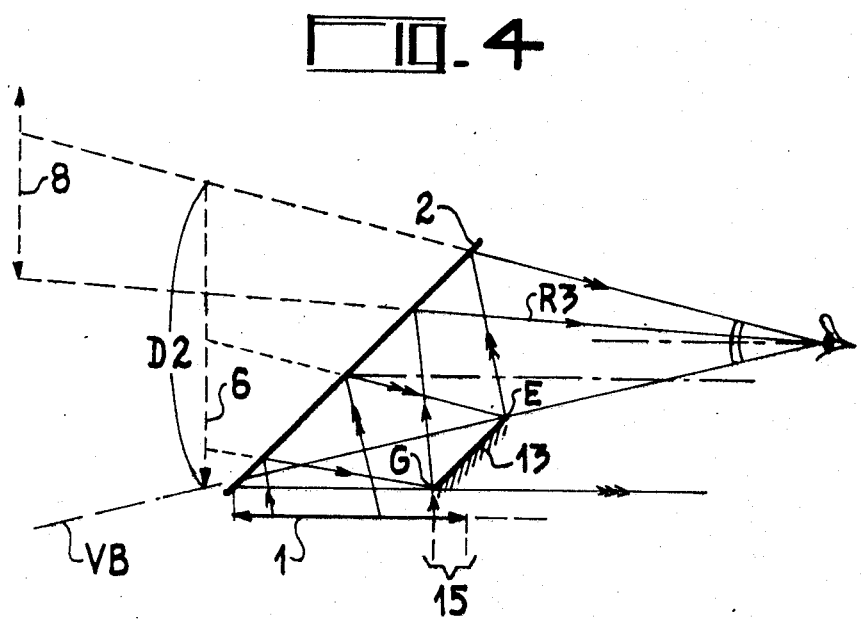

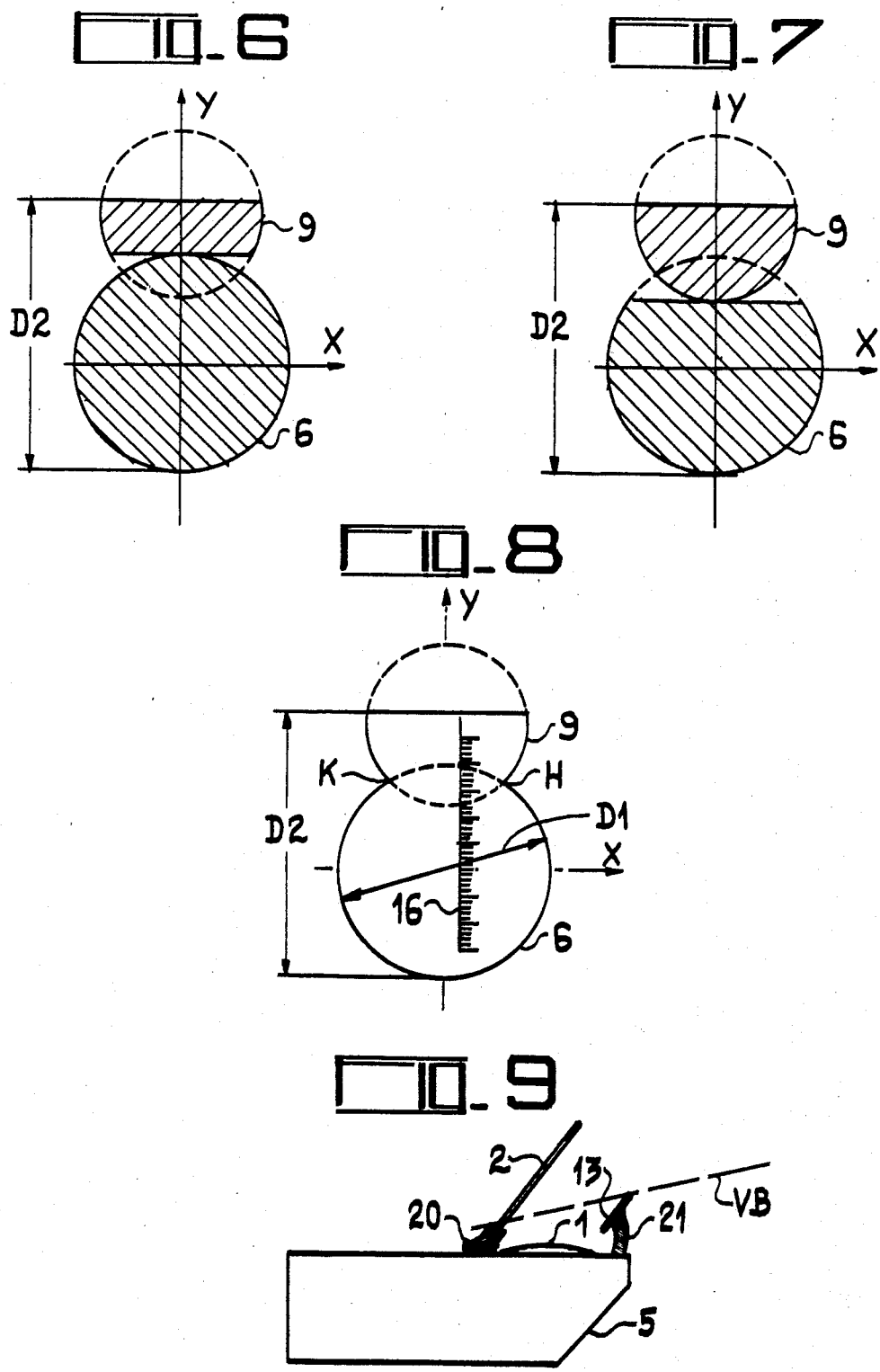

DISPLAY INSTRUMENT USING OPTICAL COLLIMATION

The present invention relates to a display instrument using optical collimation and, more particularly, to an aircraft flight data display instrument known as "head-up display" or "collimating head". This instrument enables flight data to be superimposed on the landscape or sky background seen by the pilot. The data appears in the form of luminous marks of symbols. The latter are produced from corresponding luminous objects, such as back-lighted reticles, in a synthetic image on the screen of a cathode ray tube, which are positioned in the focal area of optical lens. The reticle images are projected at infinity onto the reflective surface of a combining glass positioned in the pilot's normal line of sight. The display is thus superimposed on the landscape and eye accommodation either in distance or brightness is unnecessary. An optical mixer device may be used to combine several reticles into one very elaborate display.

The pilot must have a complete vision of the reticle images without having to move his head uncomfortably or without having to come in very close proximity to the transparent screen through which observation takes place.

The outline of the image of the lens in the glass acts as an optical pupil. The field of the equipment therefore consists in monocular vision, in the cone centred on the eye and resting upon the optical pupil and, in binocular vision, in the combination of two cones respectively centred on the eyes of the observer and resting upon the optical pupil. In a given direction of vision, the projected images remain visible for movements of either eye over an area corresponding to that of the optical pupil.

It is important that the optical pupil be of large diameter in order to increase the comfort of the pilot by enabling him to see easily at a sufficient distance from the transparent display screen.

In practice, any increase in the size of the optical pupil generally takes place at the expense of the compactness and size of the equipment. Specifically, the latter which is intended to be fitted above the instrument panel of an aircraft, must be of small dimensions vertically so as in no way to interfere with the external vision or movements of the pilot. In the case of a collimating head which has good optical characteristics and, particularly, which operates without distortion or parallax, the minimum possible height for the housing is dictated by the diameter of the optical lens.

In one known technique, an increase in the pupil is achieved by inserting a reflectively deflecting prism between the optical objective and the illuminated objects. The prism has a minor reflecting face parallel to the optical axis and the optical objective is arranged parallel to its major face.

An object of the present invention is to produce a collimating head which overcome these limitations, and in which the size of pupil obtained is larger than that of the objective at the same time as the optical qualities of the apparatus are preserved.

Another object of the invention is to achieve a local enlargement of the optical pupil preferably along the elevation direction, whithout enlarging the diameter of the optical objective lens.

According to the invention there is provided a display instrument using optical collimation for projecting data into the observer's normal line of sight, said instrument comprising a transparent combining glass positioned in said line of sight and having a surface for reflecting projected images into said line of sight; an optical objective for projecting images of luminous objects focused at infinity onto said surface; light emitting means for providing said luminous objects; and a reflective optical element for enlarging the original optical pupil defined by the outline of the image of the objective seen trough the combining glass, the said reflective optical element being arranged parallel to the glass on the same side as the objective and in the space comprised between the said latter and the field of vision whose base rests on the said original pupil, to provide an additional optical pupil which forms in conjonction with the original pupil the said enlarged pupil.

Figure 2:
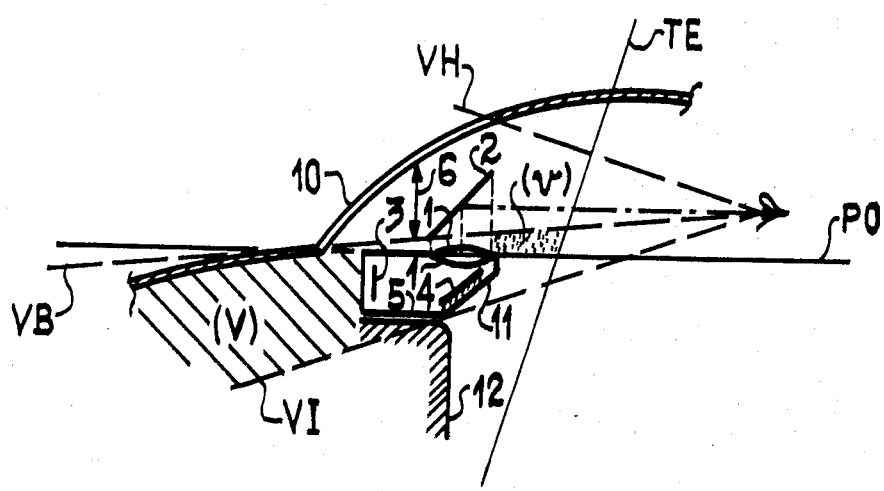

Other features of the invention will be more apparent to those skilled in the art upon a consideration of the following description and accompanying drawings, which show:

FIG. 1, a simplified diagram of a collimating display instrument according to the invention;

FIG. 2, the siting of a head-up display in the cockpit,

FIGS. 3 to 8, diagrams relating to the operation and production of a collimating display instrument according to the invention; and FIG. 9, an example of arrangement of the optical elements on the housing of the collimating head.

FIG. 1 shows, in a simplified fashion, collimating display instrument comprising an optical objective 1 which is represented by a lens whose diameter is called D1, a semi-transparent glass 2, and illuminated objects located at 3 in a focal area of the objective, F representing the focus on the optical axis. To reduce the height of the apparatus, it includes a reflecting mirror which is shown at 4 in FIG. 2, the whole assembly being supported by a housing 5.

The optical pupil of the display instrument is defined by the outline 6 of the image of the lens 1 through the glass 2.

For an observer located at A on the optical axis Z, the useful field for viewing the illuminated objects is a cone centred on the eye at A whose base rests on the pupil 6, the angular extent of the field being $w$ at the viewing distance d1 concerned. In the example shown, the apex angle $\theta$ of the field cone would have to be greater than $w$ to allow all the illuminated objects to be seen simultaneously. For this, the viewer would have to be positioned at a maximum distance of d2 from the pupil 6, at point B. When located at A, the viewer can only see simultaneously the objects lying within a reduced focal area corresponding to a circle of radius r1, the overall area having a larger radius r2. To see the objects contained in the ring between the circles of radii r1 and r2, it is necessary for the viewer to move his head in the plane 7 perpendicular to axis Z at A, it being understood that the semi-transparent glass 2 is assumed to be fixed.

Distance d1 represents the minimum possible value for viewing by the pilot under in-flight conditions. It is possible for all the objects to be seen simultaneously provided the optical pupil 6 is enlarged. In the case shown by the Figure, this means obtaining a pupil whose diameter D2 is greater than D1 and is such that the apex angle $\theta$ of the field cone at A is the one required.

As mentioned in the preambule, any increase in the diameter of the objective soon encounters restrictions imposed by bulk and cost. Expedients employing movable glasses also result in more complicated designs and require action by the pilot.

It should also be remembered that it is not generally necessary to enlarge the pupil in the left to right direction but rather in the top to bottom direction, it being more frequent in practice for the illuminated objects to be spread out in the latter direction, which is represented at YY in the plane of FIG. 1. This is the case particularly when a vertically graduated scale is to be displayed.

To obtain a local enlargement of the pupil in this preferred direction, which may be referred to as an enlargement in elevation, a reflecting optical element is located in accordance with the invention in the available space between the plane of the objective, represented by the line PO and the mirror 2 to produce a second pupil 8. Device 13 is preferably formed by a plane reflecting mirror and its dimensions, shape and position have to be determined to obtain an overall pupil 6 + 9 of the desired shape and dimensions in the widthwise direction XX and the heightwise direction YY.

In the case of an application to an airborne display instrument, FIG. 2 shows the restrictions which have to be considered in determining what is the aforesaid available space. The straight line VB indicated the lower boundary of vision and represents the line of the plane extending from the eye of the pilot to the lower edge of the windscreen 10. Line TE represents the ejection trajectory which defines within the cockpit a space in which instruments or objects liable to hamper possible ejection procedures by the pilot must not be sited, such procedures being likely in particular in military aircraft. In FIG. 2, the head-up display 11 is fitted in the low position. If it were fitted at the top of the windscreen, allowance would be made for the upper boundary of vision VH which would be dictated in the extreme case by the upper edge of the windscreen. Instruments on the instrument panel shown at 12 impose a lower, so-called instrument viewing boundary VI which must not be altered by the sitting of the display 11. The latter is thus situated in the space (V) defined between planes VB, VI and TE.

The plane of the objective of the display 11 as indicated by line PO is generally parallel to the longitudinal reference axis of the aircraft. In space (V), this plane defines a partially free space (v) which forms the available space in question. As shown, plane PO lies in the highest possible position in space (V) which is compatible with the lower boundary of vision VB, which amounts to saying that in practice the display 11 is so positioned that the pupil 6 is tangent at the bottom to line VB.

An embodiment of collimating display instrument according to the invention will now be described with reference to FIGS. 3 to 8. FIGS. 3 and 4 show the light paths in a plane of representation corresponding to the plane formed by the optical axis and direction YY, this plane being orthogonal to the plane PO of the lens 1. In observance of the general theory, the lower generatrix of the cone of vision, that is to say the lower radius of the field of simultaneous vision, is assumed to coincide with the lower boundary of vision VB. The mean line of sight corresponds broadly to the axis of symmetry of the observable pupil, and in view of the enlargement of the pupil in direction YY from D1 to a value of D2 the result, in strict terms, is a shift in the line of sight from Z to Z1, axis Z1 being parallel to axis Z and corresponding to the axis of symmetry of the enlarged pupil D2. This shift d3 can be seen in FIGS. 3 and 4, but it is ignored in the perspective view in FIG. 5 for reasons of simplicity and also in consideration of the fact that the shift may be small and negligible and that the enlargement of the pupil is localised directionally.

Figure 5:
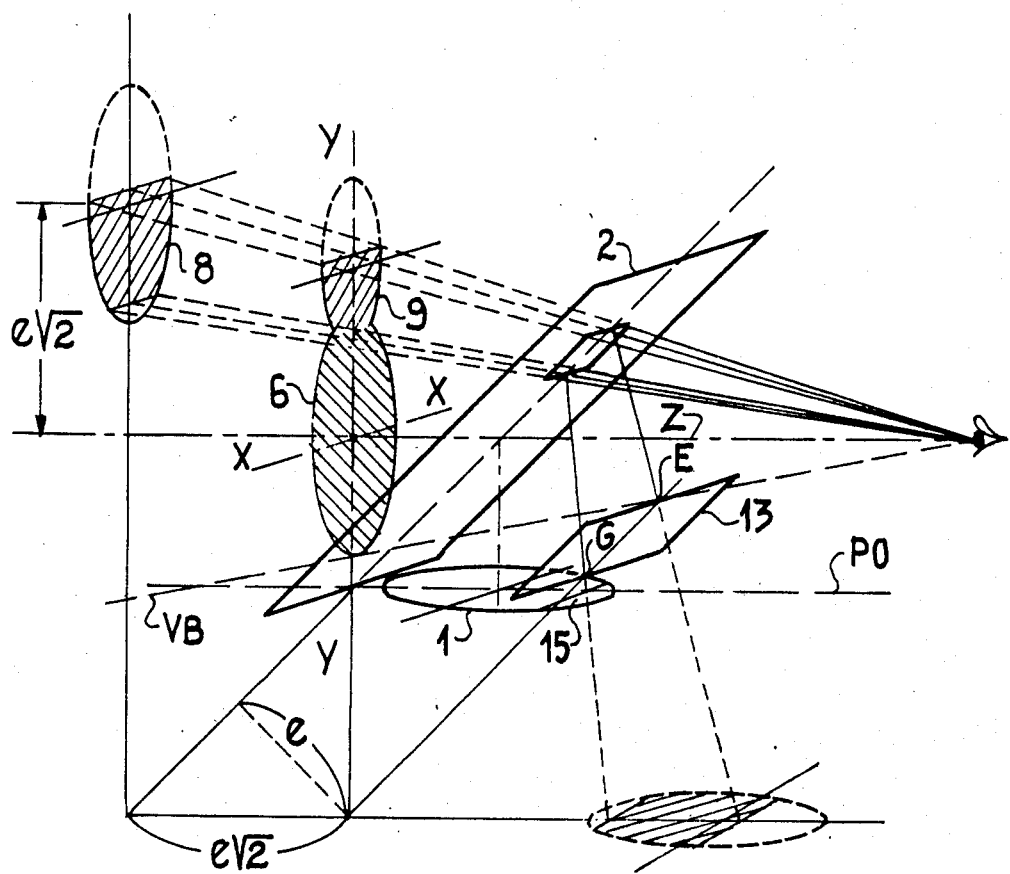

Referring to FIG. 3, the upper radius R1 of the simultaneous field of vision required produces by reflection at the glass 2, a point of intersection E with the straight line VB. The plane mirror 13 is so positioned that its upper edge coincides with point E, the mirror being orientated parallel to glass 2. Its minimum dimension EG in the plane of the Figure is given by the path of the radius R2 corresponding to the upper edge of the pupil 6 (FIG. 3) and its maximum dimension is given by the path of the radius R3 corresponding to the lower edge of the pupil 8 (FIG. 4), it being understood that the position of the lower edge G of the mirror 13 is normally restricted by the presence of the lens 1. The view shown in FIG. 4 reveals a chordal zone 15 of the lens 1 which is not used because of the close proximity of mirror 13. If the useful fraction of the pupil 8, when transposed into the plane of pupil 6, is called 9, FIGS. 6 and 7 show the enlarged pupil configurations which are obtained with the arrangements of FIGS. 3 and 4 respectively. These extreme configurations are of little interest given that the pupil narrows virtually to a point at one position on axis YY. The dimension EG of the mirror therefore has to be set at a value intermediate between the maximum and minimum values detailed above. FIG. 5 shows an appropriate arrangement and FIG. 8 the pupil obtained in plane XY. If the distance between glass 2 and mirror 13 is called $e$, the centres of pupils 6 and 8 are $e\sqrt{2}$ apart in directions YY and Z. The second dimension of the mirror 13, in direction XX, is made adequate for the useful fraction of the pupil 8 to be obtained with no restrictions, the conditions involved being the same as those to which the glass 2 is subject to allow the pupil 6 to be obtained.

In view of the large number of parameters to display, namely the predetermined position of the viewer (point A), the lower viewing boundary VB, the diameter D1 of the objective, the field angle $\theta$ to be obtained, etc. no simple formulae can be drawn up for the dimensions and position of the mirror 13 as a function of these parameters. The precise details of the arrangement must be decided case by case.

The elements 2 and 13 may be set up in fixed positions on the housing 5 of the collimating display instrument, as shown in the diagram in FIG. 9, by mechanical connecting members symbolised at 20 and 21. It is understood that more elaborate arrangements may be made to enable, in particular, the mirror 13 to be collapsed similarly at the same time; however, when operation occurs, these arrangements must ensure that the two mirrors 2 and 13 are correctly positioned, which can be achieved, for example, with an arrangement of the deformable parallelogram type and associated stop devices.

The dimensions of the mirror 13, in particular its width EG, are preferably determined as described with reference to FIGS. 5 and 8 such that the pupils 9 and 6 intersect with a sufficiently wide chord KH. In this way the resulting pupil is of a size in direction XX sufficient to allow moving illuminated objects to be projected which may be fairly far away from the vertical axis of symmetry YY. As an example of the projection of a symbol of large dimensions, a graduated vertical scale 16 is shown in FIG. 8.

The design of the embodiment shown in FIGS. 5 and 8 allows for a part 15 of the objective 1 to be masked by the mirror 13 and not to be used. Consequently, the optical objective may be truncated at this point, which makes the collimator device lighter in construction and more compact and makes it easy to site in the cockpit.

It should however be mentioned that the objects seen in the part of the simultaneous viewing field θ corresponding to the additional pupil 8 are less bright than those seen in the part of the field corresponding to the original pupil 6 as a result of the intervening reflections between elements 2 and 13. It may thus be useful, by making mirror 13 of the appropriate shape, to retain the whole of the original pupil 6, which means making the edge passing through G curved. With this design, and assuming that the edge passing through E remains linear, the additional pupil 9, when transposed into the plane of the pupil 6, will have a chord in the upper part (FIG. 8) and its lower part will follow the circle of diameter D1 of the pupil 6.

The shape of the mirror is not restricted to the shapes described, its lateral edges may be shaped to give the pupil 8 a desired format, for example, to follow its circular outline. Whatever shape is adopted, it must be ensured that the optical element 13 is located entirely within the available space (v) which is situated below the lower plane of vision VB in the case of the arrangement considered (FIG. 2).

For reasons of simplicity the field of vision of the pilot has been likened to a cone whereas in fact it consists of two cones, resulting from the fact of binocular vision, but this in no way affects the method employed in accordance with the invention to enlarge the pupil of the collimating display instrument.

What is claimed is:

1. A display instrument using optical collimation for projecting images of luminous objects into the observer's normal line of sight, said instrument comprising: a transparent combining glass positioned in said line of sight and having a surface for reflecting said projected images into said line of sight; an optical objective for projecting said images of luminous objects focused at infinity onto said surface; light emitting means for providing said luminous objects; and means for enlarging the original optical pupil defined by the outline of the image of the optical objective projected by single reflection from the combining glass into said line of sight, the said enlarging means comprising a plane reflective optical element arranged parallel to the plane of the combining glass and located between the said combining glass and the plane in which lies said optical objective to form by double reflection from said combining glass an additional optical pupil in conjunction with said original pupil.

2. A display instrument according to claim 1, wherein enlarging means is a reflective plane mirror.

3. A display instrument according to claim 2, wherein the said reflective plane mirror has two mutually parallel linear edges which are also parallel to the plane of the optical objective, field of vision, and a second edge which lies at a determined distance from the first edge to produce an enlarged pupil whose shape is such that the original pupil merges with the additional pupil along a chord of predetermined dimension.

4. A display instrument according to claim 2, wherein the said reflective plane mirror has a linear edge parallel to the plane in which lies the optical objective, and a curved edge of shape determined in relation to the outline of the image of the optical object projected by single reflection from the combining glass into said line of sight.

5. A display instrument according to claim 1, wherein the said optical objective is truncated in an unused part resulting from a masking effect caused in this zone by the said reflective enlarging means.

* * * * *